United States Patent [19]

Schnapper et al.

[11] 4,368,397
[45] Jan. 11, 1983

[54] ARRANGEMENT FOR DEEP COOLING A FIELD WINDING IN THE ROTOR OF AN ELECTRIC MACHINE

[75] Inventors: Christoph Schnapper; Lutz Intichar, both of Erlangen, Fed. Rep. of Germany

[73] Assignee: Siemens Aktiengesellschaft, Munich, Fed. Rep. of Germany

[21] Appl. No.: 148,829

[22] Filed: May 12, 1980

[30] Foreign Application Priority Data

May 22, 1979 [DE] Fed. Rep. of Germany ....... 2920720
May 22, 1979 [DE] Fed. Rep. of Germany ....... 2920742

[51] Int. Cl.$^3$ .............................................. H02K 9/00
[52] U.S. Cl. ......................................... 310/52; 62/53; 310/60 R; 310/64
[58] Field of Search ................. 310/64, 261, 10, 40 R, 310/52, 265, 53, 54, 55, 56, 57, 58, 59, 60 R, 60 A, 61, 62, 63; 417/366; 62/48, 49, 50, 51, 52, 53, 54, 55, 45, 46, 47

[56] References Cited
U.S. PATENT DOCUMENTS 4,204,134  5/1980  Fritz et al. ............................ 310/52
4,228,374 10/1980  Elsel ...................................... 310/53

OTHER PUBLICATIONS

Parker and Towne, "Superconding Generator Design", EL-577 Research Project 429-1, prepared by Westinghouse Corporation, Final Report 1977, pp. 3-258 to 3-274 and pp. 3-289 to 3-294.

Primary Examiner—A. T. Grimley
Assistant Examiner—Morris Ginsburg
Attorney, Agent, or Firm—Kenyon & Kenyon

[57] ABSTRACT

An arrangement for cooling the field winding of an electric machine to be deep cooled is provided with a rotating mixing chamber containing vaporous and liquid coolant and with a centrifugal pump between areas of different temperatures to pump gaseous coolant out of the mixing chamber. The maximum flow cross section of the colder line part of the centrifugal pump is at the most half the size of the maximum flow cross section of the warmer line parts and/or at least the end piece of the colder line part is thermally coupled to colder parts of the rotor to prevent pump instabilities caused by coolant convection.

22 Claims, 13 Drawing Figures

ARRANGEMENT FOR DEEP COOLING A FIELD WINDING IN THE ROTOR OF AN ELECTRIC MACHINE

BACKGROUND OF THE INVENTION

The invention relates to electric machines in general and more particularly to an arrangement for deep cooling field winding, in particular a superconducting field winding, in the rotor of an electric machine, particularly of a turbogenerator.

Such arrangements with a corotating mixing chamber which contains a coolant mixture of vaporous and liquid components supplied from the outside through a feed line and having a first discharge line for the discharge of a first liquid coolant stream to cool the field winding and, near the rotor shaft, another coolant discharge line running between areas of different temperature, the second discharge line being discharged in the form of a centrifugal pump to pump another gaseous coolant flow out of the mixing chamber and containing at least one colder line section which runs essentially radial relative to the rotor shaft, leading away from the shaft, and warmer line sections leading back to the vicinity of the shaft is described in "Cryogenics", July 1977, pages 429 to 433.

This cooling arrangement is based on a cooling device such as described in the dissertation by A. Bejan entitled: "Improved Thermal Design of the Crygoneic Cooling System for Superconducting Synchronous Generator", Ph.D. thesis, Massachusetts Institute of Technology (USA), December 1974, pages 145 to 167. According to this cooling device as illustrated by FIG. 1A, a coolant taken from an external coolant supply unit is fed through a central feed line 103 to a corotating, centrally disposed mixing chamber 3. This mixing chamber contains a two phase mixture of a liquid coolant A and gaseous coolant B. In the operating state, when rotating, the phases of this two phase mixture are separated by the centrifugal forces acting upon them, and the coolant vapor B accumulates in mixing chamber areas near the shaft axis 5; the liquid coolant A accumulates in mixing chamber areas away from the shaft. A liquid coolant stream flows from the mixing chamber towards the field winding 105 through radially disposed feed lines 107. The coolant then flows through the field winding, for instance, in a direction parallel to the rotor shaft. Since it is heated due to dissipation occuring there or through heat transfer from the outside, its density decreases correspondingly. This causes a hydrostatic pressure difference between the radial feed and return lines, resulting a connective flow and causing the coolant to flow back into the mixing chamber through another, radially directed return line 109. The heat absorbed leads to a temperature rise and to a partial evaporation of the coolant. The pumping action required for the coolant to flow through the field winding is thus brought about by this thermo-siphon effect based on density differences.

It is expedient to keep the coolant in the mixing chamber, required to cool the field winding, at an underpressure so that it will boil at a relatively low temperature. According to the "Cryogenics" literature reference cited, the coolant discharge line may be designed as a pumping device, utilizing the rotation and the heating of the coolant to produce the desired underpressure in the mixing chamber. In this pumping device also called a centrifugal pump, a cool coolant gas taken from the mixing chamber near the rotor shaft is conducted in one or more cold radial tubes 7 to a larger radius, thereby compressing it under the effect of centrifugal force. Then it is heated in a heating section 9 extending essentially parallel to the rotor shaft and subsequently returned through a warm radial tube 12 to the vicinity of the shaft axis, where it is conducted out of the rotating part of the machine through a rotating helium coupling 111 and fed to a refrigeration machine. The coolant is expanded again on its way to the shaft from the heating section remote from the shaft. On account of the different coolant density, the pressure difference between the points closest to and most remote from the shaft is greater on the cold side than on the warm side. If approximately atmospheric pressure prevails at the discharge point, the desired underpressure is then obtained in the mixing chamber with this self-pumping system of the centrifugal pump.

It has now been found in experiments that while an underpressure can be produced briefly with such a centrifugal pump, practically stable underpressure conditions are not obtainable in this manner over longer periods of time. For, as soon as or shortly before the calculated final pressure is reached, the pressure in the mixing chamber generally again suddenly rises to atmospheric pressure (see "Proc. of the VIIth International Cryogenics Engineering Conference" (ICEC 7), London 1978, pages 373–377, for instance). The reason for the occurrence of these instabilities and measures for the stabilization of the underpressure are not known to date, however.

Therefore, it is an object of the present invention to improve the arrangement for cooling a superconducting field winding of the type described at the outset so that a stable underpressure can be maintained in the mixing chamber with that part of the second coolant discharge line which is designed as a centrifugal pump.

SUMMARY OF THE INVENTION

According to one aspect of the present invention, this problem is solved by making the maximum flow cross section of the colder line part of the second discharge line at most half the size of the maximum flow cross section of the warmer line parts leading back to the vicinity of the rotor shaft.

According to another aspect of the present invention this problem is solved by coupling at least the end section of the colder line section of the further discharge line to the colder parts of the rotor.

Although either of these measures alone results in improved performance, it is preferred that both be used together.

These measures are based on the knowledge that the occurrence of the instability of the centrifugal pump is attributable to heat supplied to the coolant located in the colder, radial line part. This heat can flow, particularly via the coolant itself, from the warmer line parts to the colder line part, namely through heat diffusion or through convection, if a coolant flow opposed to the desired flow direction is possible, such as in the case of eddies or in convection loops. Possibly, heat can also flow into the coolant from the wall of the colder line part or from the line wall at the deflection point on the periphery through heat transfer, if the walls are warmer at these points than the coolant. Now, if heat gets into the colder line part, the coolant temperature there is increased accordingly, and the density decreases. This reduces the delivery pressure of the centrifugal pump so that an unstable behavior can occur. Possibly, the delivery pressure then becomes insufficient to maintain the pressure difference between the interior of the mixing chamber and the external pressure. The smaller the coolant flow velocity and the greater the flow of heat getting into the cold radial tube, the smaller the delivery pressure will become and the sooner the pump will tend towards instabilities.

With the flow cross section design provided according to the first aspect of the present ivention, at a given mass throughput, the flow velocity in the colder line part becomes sufficient to prevent eddies of warmer coolant, caused by convection, from penetrating the coolant discharged in the opposite direction in the colder line part. The flow of heat into the coolant in this line part can thus be kept appropriately small.

According to an advantageous further development of the cooling arrangement according to the present invention, a portion of the warmer line parts of the second discharge line may have a flow cross section which, as viewed in the flow direction of the discharged coolant, expands gradually or in steps from a predetermined flow cross section of the colder line part to the predetermined flow cross section of the warmer line parts. The flow cross section of this portion can thus be adapted to the coolant viscosity which increases and the coolant density which decreases with increasing temperature.

The thermal coupling of at least the end piece away from the shaft of the colder line part to colder rotor parts, in accordance with the second aspect of the present invention, assures that convection eddies in the coolant heated in the warmer line part are cooled down at this point at least to the temperature of the coolant discharging in the colder line part, thus cancelling the convection.

In addition, to limit the flow of heat into the coolant in the colder line part, a warmer line part of the second discharge line may be designed, near the connecting point to the colder line part, as a convection trap for the coolant to be discharged. With such a convection trap, known per se, the penetration of the coolant heated in the warmer line part into the colder line part is reduced even further. Such may be used with systems designed according to one or both aspects of the present invention, i.e., in a design with only the expanded cross-section, only the thermal coupling or both.

Other advantageous embodiments of the cooling arrangement of the present invention are also disclosed.

DETAILED DESCRIPTION OF THE INVENTION

Figure 1:
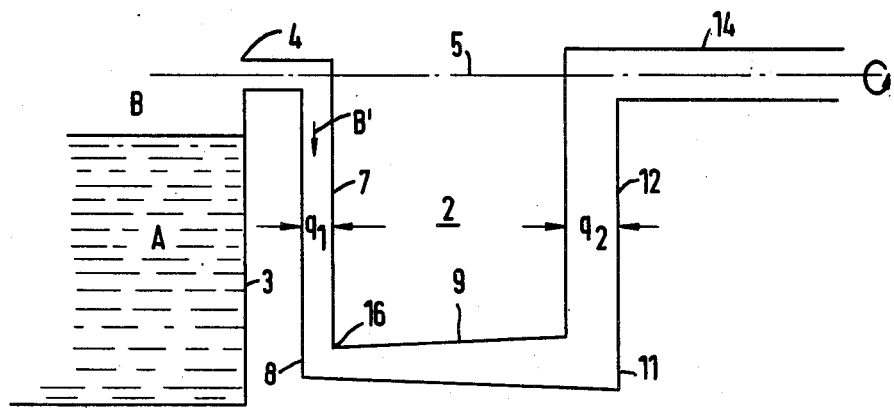
FIG. 1 is a schematic longitudinal section of of first embodiment of a coolant discharge line, designed as a centrifugal pump, in a cooling arrangement according to the present invention.

The centrifugal pump shown in FIG. 1 is based on a device for the generation of underpressure in a cryostat tank such as known from the literature reference "Cryogenics", July 1977, pages 429–433. With this pump, which is part of a coolant discharge line generally marked 2, it is intended to create an underpressure in a mixing chamber 3, only partially shown in FIG. 1. The mixing chamber is located centrally in the rotor of an electric machine, in particular of a turbogenerator. In the operating state of the machine it contains a two-phase mixture of liquid and gaseous coolant A and B, respectively. The coolant is taken from an external coolant supply unit and fed to the mixing chamber through a coolant feeder line which contains a coolant coupling at a connector head of the rotor. At the coolant coupling, known from the literature reference "Siemens Forschungs- und Entwicklungsberichte", Vol. 5, 1976, No. 1, page 13, for instance, the coolant is transferred from stationary to rotating parts of the machine. In the operating state, when the rotor is rotating, the phases of the two-phase mixture in the mixing chamber 3 are separated by the effect of the centrifugal forces acting upon them. The liquid coolant present in the mixing chamber is used to cool a superconducting field winding to be deep-cooled in the rotor. As a coolant for superconductors, only helium is generally considered; for other conductors to be deep-cooled an appropriate cryogenic medium such as hydrogen or nitrogen can be considered.

At a central discharge point 4 near the axis of rotation 5, gaseous coolant B' is aspirated from the mixing chamber 3 by means of the centrifugal pump. According to the longitudinal section of the Figure, the part of the discharge line 2 forming the centrifugal pump is U-shaped. It contains at least one, e.g., tubular, line part 7 which runs radial relative to the axis of rotation 5 and by which the coolant vapor B' is brought from the discharge point 4 near the axis to a radius large relative to the axis of rotation 5. An end piece 8 of this line part 7, away from the axis, empties into a connecting piece 9, which may be tubular and which extends parallel to the axis of rotation 5. Connected to its end away from the line part 7 is the end piece 11 of another tubular line part 12 which extends in the radial direction relative to the axis of rotation 5 and leads, near the axis 5, into a central coolant discharge line 14. A rotating coolant coupling, not shown in the Figure, is also provided in this discharge line, by means of which the coolant gas B' is conducted out of the machine at a connector head of the rotor and then fed to an external coolant supply unit, for instance.

Since the connector head with the coolant discharge line 14 is generally at a higher temperature, such as room temperature, and the discharge point 4 for the coolant vapor B' from the mixing chamber at cryotemperature, the coolant vapor B' diverted through the centrifugal pump must pass through a corresponding temperature gradient. Therefore, the radial line part 7 of the centrifugal pump on the side of the mixing chamber 3 is also called the cold line part and the radial line part 12 on the side of the connector head the warm line part. The connecting piece 9 between these two line parts thus represents a heating section for the coolant B'. This heating section may expediently be coupled thermally to parts of the rotor body to establish in them appropriate temperature conditions.

The cold coolant gas B' leaving the interior of the mixing chamber 3 at the discharge point 4 is conducted in the cold, radial line part 7 to a larger radius from the axis of rotation and thereby compressed by the effect of centrifugal force. The coolant is then heated in the connecting piece 9 and subsequently returned to the vicinity of the axis 5 through the warmer radial line part 12 where it then leaves the rotating part of the machine via the coolant coupling. On its way from the periphery to the axis the coolant is expanded again.

On account of the different coolant densities, the pressure difference between the points nearest to and remotest from the axis is greater on the cold side than on the warm side. If approximately atmospheric pressure prevails at the discharge point, an underpressure is thus obtained at the point of discharge 4 from the mixing chamber 3. Thus, the known self-pumping effect is utilized in the centrifugal pump.

According to the present invention, the maximum flow cross section of the colder line part 7, designated $q1$ in the Figure, is selected to be at most half the size of the maximum flow cross section, designated $q2$, of the parts 9 and 12 of the coolant discharge line 2 connected to the colder line part 7 and returning to the vicinity of the axis. Preferably, the maxiumum flow cross section $q1$ of the colder line part 7 is at the most one-third of the maximum flow cross section $q2$ of the warmer line parts 9 and 12. What these dimensions achieve is that the flow velocity is increased in the colder line part 7, thus inhibiting convection eddies from entering this line part.

On the other hand, the cross section must be large enough so that the pressure drop due to flow resistance in the entire coolant discharge line 2 is small as compared to the delivery pressure of the pump. If the flow cross sections $q1$ and $q2$ were the same, the essential pressure drop would occur in the warmer line parts because of the greater dynamic viscosity and the lesser density of the warmer coolant in the warmer line parts. Therefore, $q1$ can advantageously be chose considerably smaller than $q2$ without an essential increase of the entire pressure drop in the discharge line.

Advantageously, the warmer line part connected to the colder line part may have a flow cross section increasing gradually or stepwise. An adaptation to the coolant viscosity which increases with increasing coolant temperature of the coolant B' and its density which decreases with increasing coolant temperature can thus be achieved. It is assumed in the embodiment if FIG. 1 that the portion 9 of the warmer line part, being parallel to the axis and representing a heating section, is designed so as to expand conically from the flow cross section $q1$ of the colder line part 7 of the flow cross section $q2$ of the warmer line part 12.

In an other cooling arrangement according to the present invention, the flow of heat entering the cold radial line part 7 from the outside is advantageously restricted by coupling this line part thermally to even colder spots of the rotor. According to the embodiments of a cooling arrangement shown as a longitudinal section in FIGS. 2 and 3, the end piece 8 of the colder radial line part 7 remote from the axis, and its opening 16 into the connecting piece 9 are coupled in thermally conducting fashion to the liquid coolant A in the mixing chamber by a part 15 of highly heat conducting material such as copper or aluminum. For, this coolant is generally colder than the compressed coolant vapor in the end piece 8. In this manner, heat can be withdrawn from the coolant vapor at this point and its temperature thus reduced. Then the colder, denser coolant is at a greater radial distance from the axis 5 so that no buoyant force is active, for which reason no eddies will form either. The heating section in the connecting piece 9, in which a rise in temperature of the coolant vapor B' in the discharge line 2 takes place, is marked 17 in the Figure. In the embodiment illustrated in FIG. 2, its flow cross section, like the flow cross section of the adjoining warmer line part 12, is at least twice the size of the flow cross section of the colder line part 7. However, according to FIG. 3, it is also possible to make use of only the aspect of coupling to a colder rotor part according to the present invention, in this and other embodiments where such thermal coupling is provided. The rest of the components of the cooling arrangements of FIGS. 2 and 3 correspond to the components shown in FIG. 1 and have the same reference symbols.

Figure 2:
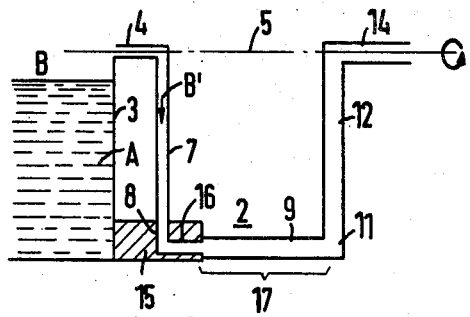
FIG. 2 is a similar view of such cooling arrangement utilizing a highly heat conducting part.
Figure 4:
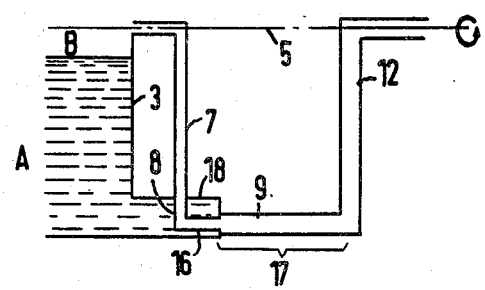
FIG. 4 is a similar view in which a radial line part in the centrifugal pump portion is contacted directly by a liquid coolant.

The centrifugal pump shown in FIG. 4 in a longitudinal section corresponds essentially to the embodiment according to FIG. 2. This centrifugal pump differs from the embodiment according to FIG. 2 merely in that the end piece 8 of its colder, radial line part 7 and the mouth 16 of the connecting piece 9 are not coupled thermally to the liquid coolant A in the mixing chamber 3 indirectly via a thermally well conducting part, but that the end piece 8 and the mouth 16 are contacted directly by the liquid coolant in that they are located in an appropriate coolant canal 18 connected to the mixing chamber. Thus, a direct heat exchange between these points of the centrifugal pump and the colder coolant A is effected. The heating section 17 for the coolant gas is then the part of the connecting piece 9 located outside of the coolant bath.

Figure 3:
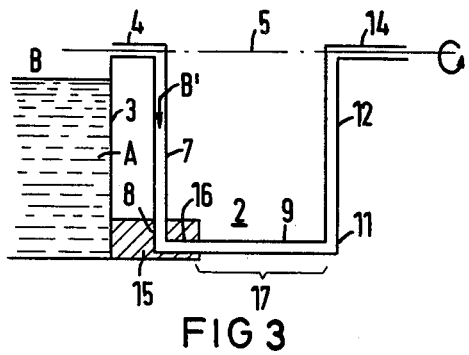
FIG. 3 is a view of a modification of the system according to FIG. 2.
Figure 5:
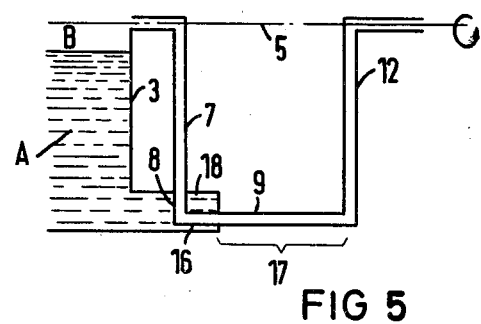
FIG. 5 is a view of a modification of the embodiment of FIG. 4.
Figure 1A:
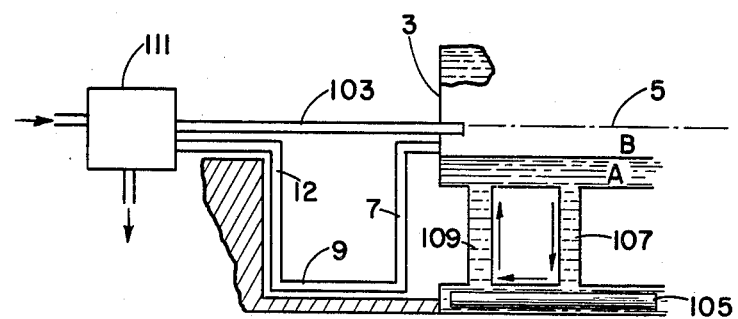
FIG. 1A is a cross-sectional schematic view of the cooling arrangement known in the prior art.

The centrifugal pump shown in FIG. 5 corresponding essentially to the embodiment according to FIG. 3, differs from this embodiment merely in that the end piece 8 of its colder, radial line part 7 and the mouth 16 of the connecting piece 9 are coupled thermally to the liquid coolant A in the manner of the embodiment shown in FIG. 4.

Figure 6:
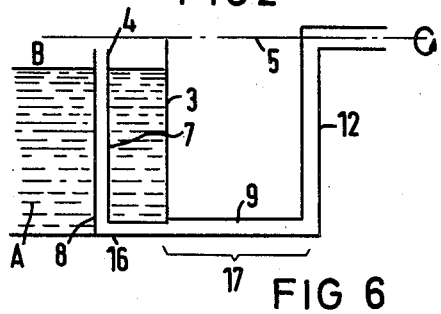
FIG. 6 is also a schematic longitudinal section of a coolant discharge line according to the present invention showing another arrangement for cooling by direct contact.

According to FIG. 6, thermal coupling of the colder line part 7 and the mouth 16 can also be obtained in that the entire line part 7 and the mouth 16 of the connecting piece 9 are disposed in the mixing chamber 3. The end of the line part 7 near the axis, designed as the discharge point 4, is then located in that part of the mixing chamber 3 which is filled with gaseous coolant B.

Figure 7:
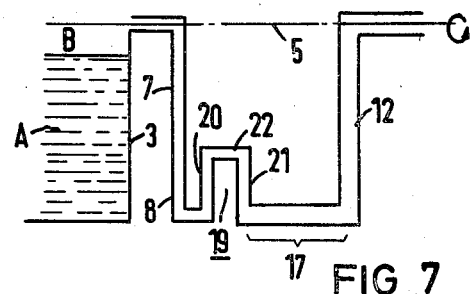
FIG. 7 is a similar view of another embodiment of the present invention which includes a convection trap.

In the cooling arrangement according to the present invention, convection of heated coolant in the colder, radial line part can be reduced further by a convection trap. Accordingly, as shown in FIG. 7, the connecting piece 9 at the mouth of the colder, radial line part 7, 8 is designed in the form of a U-shaped siphon 19. This siphon is located on a comparatively smaller radius than the heating section 17 and consists of two parallel siphon tubes 20 and 21 which extend radially and are interconnected by a connecting tube 22 parallel to the axis. While the coolant gas heated in the heating section 17 experiences a lift towards the axis of rotation due to the centrifugal force and could possibly enter the siphon tube 21, it is prevented by the buoyant force from entering the siphon tube 20. Accordingly, a convection of the coolant from the heating section 17 to the colder, radial line parts 7 and 8 is prevented by this siphon. The siphon, therefore, represents a convection trap for the coolant gas heated in the heating section 17.

Figure 8:
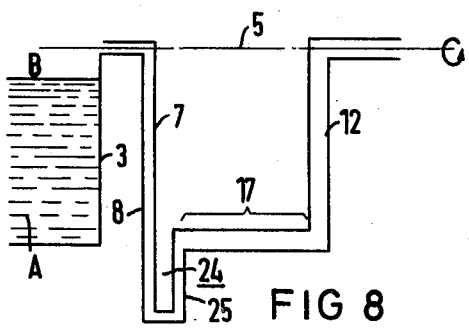
FIG. 8 is a similar view of another embodiment with a convection trap in a somewhat different location.

In contrast to the centrifugal pump shown in FIG. 7 with a siphon on a smaller radius than the heating section, the centrifugal pump shown in FIG. 8 is equipped with a siphon 24 located on a larger radius than the heating section 17. In this embodiment, the buoyant force prevents the coolant heated in the heating section 17 from entering the radial siphon tube 25 connected to it right from the start.

Figure 9:
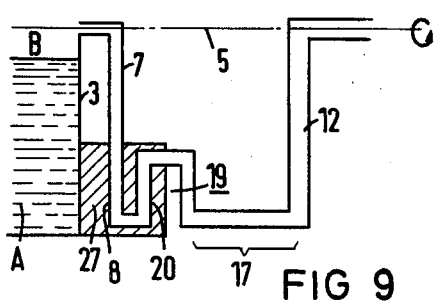
FIG. 9 illustrates an embodiment in which cooling in the area of the convection trap is carried out by means of a block of material of high thermal conductivity.

The centrifugal pump shown in FIG. 9 contains a siphon 19 corresponding to the embodiment according to FIG. 7 and is coupled thermally in the manner of the embodiment shown in FIG. 2. According to that, the end piece 8 of the line part 7, away from the axis, and the adjacent leg 20 of the U-shaped siphon 19 are coupled in a thermally fashion to the liquid coolant A in the mixing chamber 3 by a part 27 of highly heat conducting material.

Figure 10:
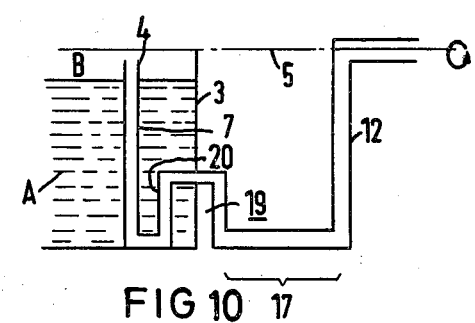
FIG. 10 is a view of a modification of the embodiment of FIG. 9 where direct cooling by the liquid coolant takes place.

Deviating from the embodiment of a centrifugal pump shown in FIG. 9, the thermal coupling in the pump shown in FIG. 10, which likewise contains a siphon 19, is accomplished by a direct heat exchange with the colder coolant according to the embodiment of FIG. 6 in that the entire radial line part 7 and the adjacent leg 20 of the siphon 19 are disposed in the bath of the liquid coolant A in the mixing chamber 3.

Figure 11:
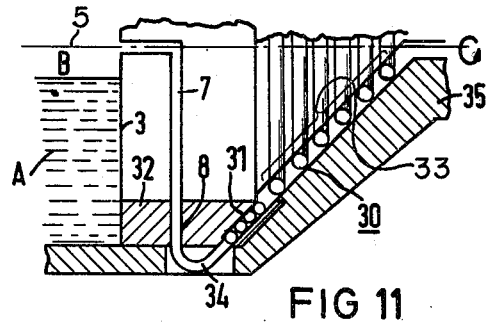
FIG. 11 illustrates a further embodiment of the present invention utilizing an oblique line part.

The embodiments of centrifugal pumps according to FIGS. 1 to 10 were based on the premise that the respective heating section between colder and warmer line parts of the coolant discharge line always ran parallel to the axis of rotation. However, this position of the heating section is immaterial for the present invention. Therefore, in the embodiment of a centrifugal pump according to FIG. 11, the heating section, together with a warmer line part connected to it, may form a joint line part 30 which runs obliquely relative to the axis of rotation 5. The end piece 8 of the cold, radial line part 7 remote from the axis and portion 31 of the oblique line part 30 remote from the axis are thermally coupled to the colder, liquid coolant A in the mixing chamber 3 by a part 32 of thermally highly conducting material. Accordingly, the heating section 33 for the gaseous coolant is the portion of the line part 30 which extends between the part 32 and the axis of rotation 5. The end piece 8 and the portion 31 are interconnected by a bent tubular part 34. This tubular part, being on a larger radius than the heating section 33 of the line part 30, likewise represents a siphon which, as far as its operating mode is concerned, corresponds essentially to the siphon 24 according to FIG. 8.

It is also immaterial for the present invention whether the heating section of the centrifugal pump is designed in the form of a helix or coil on the circumference of a rotating cylinder or of a rotating cone. In the embodiment according to FIG. 11 a spiral form of the heating section 33 is assumed, which is disposed on the inside of a torque transmitting cone 35 shown only in part.

Figure 12:
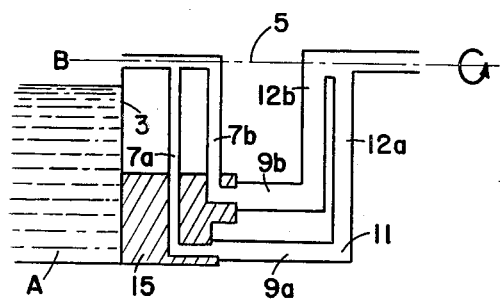
FIG. 12 is a view similar to FIG. 2 showing parallel lines.

It was assumed in the embodiments according to FIGS. 1 to 11 that the coolant discharge line 2 has only one single guide channel for the coolant. If applicable, however, several paralleled channels may also be provided as shown in FIG. 12. This can prevent excessive pressure drops in the discharge line. Accordingly, it is expedient to design the colder line part 7 and at least a major portion of the heating section 17 connected to it as paralleled channels 7a and 7b and 9a and 9b. A reunification of the coolant flows conducted through these channels then takes place behind this portion of the heating section at the earliest, and in particular only after having passed through the warmer radial line 12a and 12b parts near the axis of rotation.

It was also assumed in the embodiments of a cooling arrangement according to the present invention as shown in FIGS. 4, 5, 6 and 10 that at least portions of the colder line parts of the coolant discharge lines were contacted directly. But an appropriate thermal coupling of these parts is possible just as well indirectly via at least one heat exchanger.

What is claimed is:

1. In an arrangement for deep cooling a field winding, in the rotor of an electric machine with a rotor axis and a corotating mixing chamber which contains a coolant mixture of vaporous and liquid components supplied from the outside through a feed line and to which are connected a first discharge line for the discharge of a first, liquid coolant stream to cool the field winding, and near the rotor axis, a second coolant discharge line running between areas of different temperatures, the second discharge line being designed in form of a centrifugal pump to pump a second, gaseous coolant flow out of the mixing chamber and containing at least one colder line part which runs essentially radial relative to the rotor axis, leading away from the rotor axis, followed by warmer line parts leading back to the vicinity of the rotor axis, there being a connecting point between said colder line part and said warmer line parts, the improvement comprising the maximum flow cross section of the colder line part of the second discharge line being at the most half the size of the maximum flow cross section of the warmer line parts leading back to the vicinity of the rotor axis.

2. The improvement according to claim 1, wherein the ratio of the maximum flow cross section of the colder line part to the maximum flow cross section of the warmer line parts does not exceed 1:3.

3. The improvement according to claim 1, wherein a portion of the warmer line parts of the second discharge line has a flow cross section which, as viewed in the flow direction of the gaseous coolant expands from the smaller flow cross section of the colder line part to the larger flow cross section of the warmer line parts.

4. The improvement according to claim 1 wherein a warmer line part of the second discharge line near its connecting point to the colder line part is in the form of a convection trap for the coolant to be discharged.

5. The improvement according to claim 4, wherein said convection trap is in the form of a U-shaped line part.

6. The improvement according to claim 4, wherein said convection trap is disposed on a larger radius than the warmer line parts of the second discharge line.

7. The improvement according to claim 1 or 4, wherein the warmer line parts of the second discharge line are obliquely disposed relative to the rotor axis.

8. The improvement according to claim 1, wherein the warmer line parts of the second discharge line contain at least one part remote from the axis, running essentially parallel to the rotor axis, with a heating section for the gaseous coolant, and another line part running essentially radial relative to the rotor axis.

9. The improvement according to claim 1, wherein the colder line part and at least one portion of the warmer line parts of the coolant discharge line connected to the colder line part comprise paralleled coolant conduction channels.

10. In an arrangement for deep cooling a field winding, in the rotor of an electric machine with a rotor axis and a corotating mixing chamber which contains a coolant mixture of vaporous and liquid components supplied from the outside through a feed line and to which are connected a first discharge line for the discharge of a first, liquid coolant stream to cool the field winding and, near the rotor axis, a second coolant discharge line running between areas of different temperatures, the second discharge line being designed in form of a centrifugal pump to pump a second, gaseous coolant flow out of the mixing chamber and containing at least one colder line section which runs essentially radial relative to the rotor axis leading away from the rotor axis, and warmer line sections leading back to the vicinity of the rotor axis, the improvement comprising at least the end section of the colder line sections of the second discharge line being thermally coupled to colder parts of the rotor.

11. The improvement according to claim 10, comprising a connecting body of highly heat-conducting material disposed between at least the end section of the colder line section away from the rotor axis and the liquid coolant in the mixing chamber.

12. The improvement according to claim 10, wherein at least the end section of the colder line section away from the rotor axis is exposed to the flow of the liquid coolant of the mixing chamber.

13. The improvement according to claim 12, wherein the entire cold line section of the second discharge line is disposed in the bath of the liquid coolant in the mixing chamber.

14. The improvement according to claim 10, comprising at least one heat exchanger indirectly exposing at least the end section, away from the rotor axis, of the colder line section to the flow of the liquid coolant of the mixing chamber.

15. The improvement according to claim 10 wherein the maximum flow cross section of the colder line section of the second discharge line is at most one-half and prefereably at most one-third the size of the maximum flow cross section of the warmer line sections leading back to the vicinity of the rotor axis.

16. The improvement according to claim 15, wherein a portion of the warmer line sections of the second discharge line has a flow cross section which, as viewed in the flow direction of the discharged coolant expands from the smaller flow cross section of the colder line section to the larger flow cross section of the warmer line section.

17. The improvement according to claim 10 or 15 wherein a warmer line section of the second discharge line near its connecting point to the colder line part is in the form of a convection trap for the coolant to be discharged.

18. The improvement according to claim 17, wherein said convection trap is in the form of a U-shaped line part.

19. The improvement according to claim 17, wherein said convection trap is disposed on a larger radius than the warmer line sections of the second discharge line.

20. The improvement according to claim 17, wherein the warmer line sections of the second discharge line are obliquely disposed relative to the rotor.

21. The improvement according to claim 10, wherein the warmer line parts of the second discharge line contain at least one part remote from the axis, running essentially parallel to the rotor axis, with a heating section for the discharged coolant, and another line sections running essentially radial relative to the rotor axis.

22. The improvement according to claim 10, wherein the colder line section and at least one portion of the warmer line parts of the coolant discharge line connected to the colder line section comprise paralleled coolant conduction channels.

* * * * *